United States Patent [19]
Eguchi

[11] Patent Number: 5,698,916
[45] Date of Patent: Dec. 16, 1997

[54] SLENDER MOTOR FOR CANNED MOTOR PUMP

[75] Inventor: Masaaki Eguchi, Tokyo, Japan

[73] Assignee: Nikkiso Co., Ltd., Tokyo, Japan

[21] Appl. No.: 346,632

[22] Filed: Nov. 30, 1994

[51] Int. Cl.[6] .............. H02K 5/10; H02K 5/12; H02K 9/00
[52] U.S. Cl. .............. 310/86; 310/87; 310/54; 310/58
[58] Field of Search .............. 417/423.8, 423.9–423.14, 417/357; 310/86, 87, 90, 54, 58

[56] References Cited

U.S. PATENT DOCUMENTS

| | | | |
|---|---|---|---|
| 3,050,645 | 8/1962 | Redding, Jr. | 310/87 |
| 3,671,786 | 6/1972 | Jones | 310/87 |
| 3,754,844 | 8/1973 | Nusser et al. | 417/423 R |
| 3,771,909 | 11/1973 | Rousseau et al. | 417/424 |
| 4,283,645 | 8/1981 | Hofmann | 310/87 |
| 4,577,128 | 3/1986 | Gould et al. | 310/87 |
| 4,684,329 | 8/1987 | Hashimoto | 417/357 |
| 4,745,316 | 5/1988 | Nakashima et al. | 310/87 |
| 4,990,068 | 2/1991 | Zhong et al. | 417/423.8 |
| 5,078,628 | 1/1992 | Garis, Jr. | 440/6 |
| 5,256,038 | 10/1993 | Fairman | 417/423.11 |

*Primary Examiner*—Thomas M. Dougherty
*Assistant Examiner*—Michael Wallace, Jr.
*Attorney, Agent, or Firm*—Robert D. Schaffer; Rogers & Wells

[57] ABSTRACT

A slender motor for a cannned motor pump in which a motor rotor is provided between a pair of bearings on a rotor shaft, and a motor stator is provided throuth a path for a cooling and lubrication liquid around the motor rotor, whereby a ratio of axial length to diameter of the motor rotor is so set as to permit the cooling and lubrication liquid passing through the path to provide a bearing effect on the rotor shaft.

1 Claim, 3 Drawing Sheets

SLENDER MOTOR FOR CANNED MOTOR PUMP

BACKGROUND OF THE INVENTION

This invention relates to a motor for a canned motor pump, and more particularly to a slender motor for a canned motor pump with a large ratio of a rotor length to a rotor diameter to permit the motor to show a bearing effect.

Generally, as shown in FIG. 1, a motor 10 for a canned motor pump comprises a pair of bearings 14 on a rotor shaft 12, a motor rotor 16 between the bearings 14, a lubricating liquid path 18 around the rotor 16 for cooling the motor and a motor stator 20. By circulating a part of a treating liquid from a pump 22 through a pipe 24 and the path 18 into the motor 10, the motor 10 and the bearings 14 will be cooled and lubricated. A stator can 28 and a motor housing 26 in FIG. 1 are provided around the rotor and on the outerside of the motor stator resrespectively. In the canned motor pump using such a motor, a rotor shaft is supported by a pair of the bearings at opposite sides of the motor to perform a complete leakless structure without any sealed part. This requires no exclusive cooling nor lubricating system, for which reason the canned motor pumps may be widely applicable to pumps for chemical plants and the like.

However, the conventional motor for the canned motor pump has disadvantages as described below. In the conventional motor 10, a shape coefficient $\epsilon$ (=l/D) is designed to be in the range from about 1.5 to about 3.5 where l and D are the axial length and the diameter of a rotor 16 respectively. This ratio is restricted by conditions for manufacturing. As described below, in a motor rotor having specified length and diameter, a bearing effect is generated on a rotor shaft 12 due to cooling and lubrication when the treating liquid passes through the path 18. Notwithstanding, no substantial bearing effect was observed on the actual and conventional rotor shaft 12 for the motor 16 with the coefficient $\epsilon$ in the above range.

In the canned motor pump with the conventional motor construction, as is schematically shown in FIG. 2(a), a rotor shaft 12 together with its supports constitutes a vibration system supported by two points (FIGS. 2(b) and (c)). The motor rotor 16 has the small ratio $\epsilon$ thereby resulting in a large diameter D and an increase in a peripheral rotational speed. This results in a large amount of cavitation erosion and an increase in fluid friction resistance which is proportional to the fifth power of D against the cooling and lubrication liquid flowing through the path 18. Thus, a fluid friction loss of the flowing liquid and a bearing load on the rotor shaft 12 become large. These further cause increases of the rotor shaft diameter d and the capacity of the bearings 14.

It becomes clear from the above description that in changing pump specifications and more particularly in varying rotor shaft speed, modifications and changes in many design parameters including changes in diameter d of the rotor 12, capacity of the bearings 14 and span L(FIG. 2(a)) are necessary in order to avoid dangerous rotational speed of the rotor. The requirement of these modifications is made essential for high speed and variable speed driving of the pump by use of inverter driving.

SUMMARY OF THE INVENTION

It is an object of the invention to provide a slender motor for a canned motor pump where any dangerous speed and rotation are effectively avoided in an increase of a rotor speed, by generating a bearing effect on the rotor shaft and by decreasing fluid friction loss against the cooling and lubrication liquid.

In order to achieve the above object, a slender motor for a canned motor pump in this invention is provided with a motor rotor between a pair of bearings on a rotor shaft, and a motor stator through a path for cooling and lubrication liquid around the motor rotor. The motor structure comprises the following elements. A stator is provided with an inner wall which cylindrically defines an inner space having a center axis, a first length in an axial direction and a first diameter. A rotary shaft is provided to extend on the center axis and to be accommodated within the inner space. A rotor is provided to be accommodated within the inner space and fixed on a center part of the rotary shaft so as to show a rotation in conjunction with the rotary shaft. The rotor is cylindrically defined to have both a second length, in the axial direction, smaller than the first length and a second diameter smaller than the first diameter so as to form, between the rotor and the inner wall, a first clearance providing a first path for a cooling and lubricating liquid. Bearings are also provided on the rotary shaft at opposite sides of the rotor and spaced apart from the rotor. It is further essential for the present invention that a ratio of the second length to the second diameter is not less than 5 thereby to allow the cooling and lubricating liquid flowing in the first clearance in order to provide a secondary bearing function for supporting the rotor directly.

According to the present invention described above, and not only is the rotary shaft, but also the rotor are supported by the above. The primary and secondary bearing functions in order to improve the stability of rotations of the rotor and the rotary shaft and settle the above problem raised in the prior art. The rotor is detached via the cooling and lubricating liquid from the inner wall of the stator in order to obtain a considerable reduction in friction of the rotor against the inner wall of the stator. This protects the rotor from a frictional wear and allows the same to have a long life time. Moreover, those frictional reduction can improve performances of the motor particularly at high speed rotation. The motor is characterized by a ratio of axial length to diameter of the motor rotor which is so set as to permit the cooling and lubricating liquid passing through the path to provide a bearing effect on the rotor shaft. The ratio is normally not less than 5. By setting the ratio of axial length to diameter of the motor rotor as specified, a bearing effect on the rotor shaft is provided due to cooling and lubrication when the liquid passes through the path between the stator and the rotor. The definition of the slender rotor allows the rotational peripheral speed to be reduced, and also decreases of the fluid friction loss against the cooling and lubrication liquid passing through the path as well as the bearing load.

Unlike the above conventional motors, the motor of the present invention offers an effective element for avoiding any dangerous speed and rotation of the rotor shaft in an increase of rotor speed without any need for modifications or changes in design parameters of the rotor shaft, and the bearins, etc.

DETAILED DESCRIPTIONS OF THE INVENTION

This invention will be described in further detail by way of embodiment of a slender motor for a canned motor pump with reference to the accompanying drawings. For convenience, detailed descriptions will be omitted for the elements identical with the conventional ones in FIGS. 1 and 2.

Figure 1:
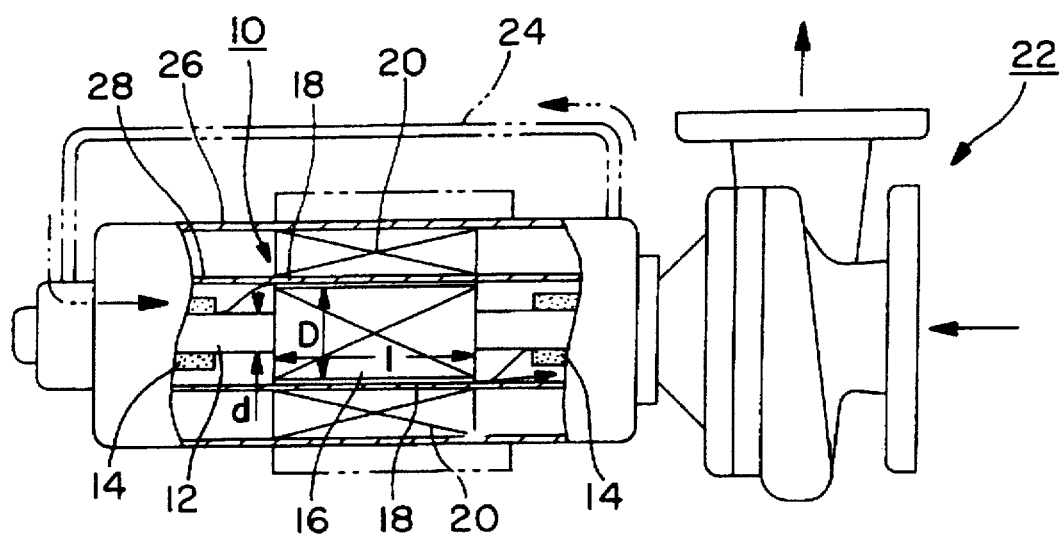
FIG. 1 is a partially cutaway drawing showing sectional view of an ordinary canned motor pump.
Figure 2A:
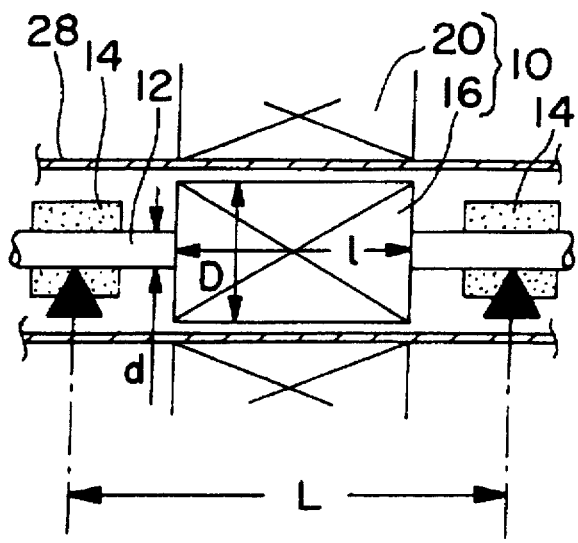
FIG. 2 indicates an example of an ordinary motor for a canned motor pump, where (a) is a general arrangement, (b) a schematic drawing of supporting mechanism and (c) mode type.
Figure 2B:
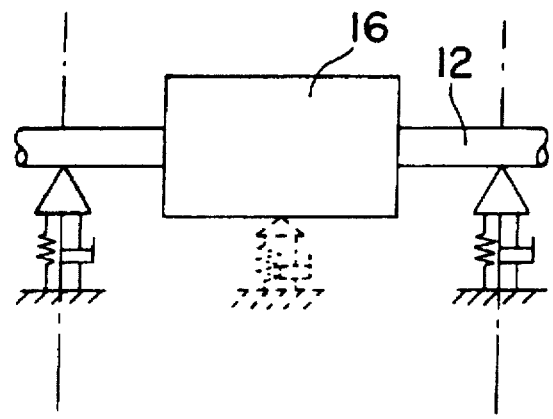
Figure 2C:
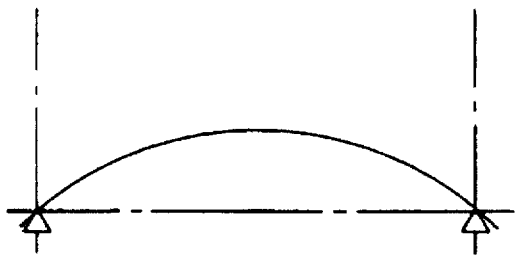

A slender motor for a canned motor pump in this embodiment is basically identical in its construction with conventional ones as shown in FIG. 1. However, the motor 10 in this invention has a pair of bearings 14 on a rotor shaft 12, a motor rotor 16 between the bearings 14, a motor stator 20 around the outer surface of the motor rotor 16 through a lubricating liquid path 18 for cooling and lubrication. A stator can 28 is mounted on the outer side of the rotor. In this embodiment, the motor rotor 16 is designed to be slender in such a way that a shape coefficient $\epsilon$ ($=1/D$) is preferably not less than 5 (as a matter of course for a given output power) where 1 and D are the axial length and the diameter of the rotor respectively. In this rotor arrangement, a bearing effect is generated on the rotor 12 by cooling and lubrication as the liquid passes through the path 18.

Figure 3A:
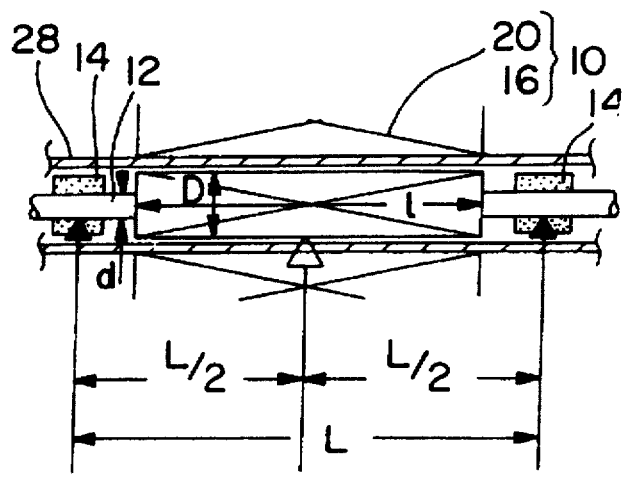
FIG. 3 illustrates an example of a slender motor related to this invention for a canned motor pump, whrere (a) shows a general arrangement, (b) a schematic drawing of supporting mechanism and (c) mode type.
Figure 3B:
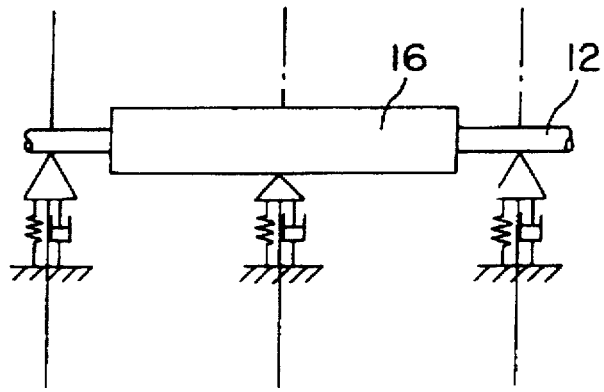
Figure 3C:
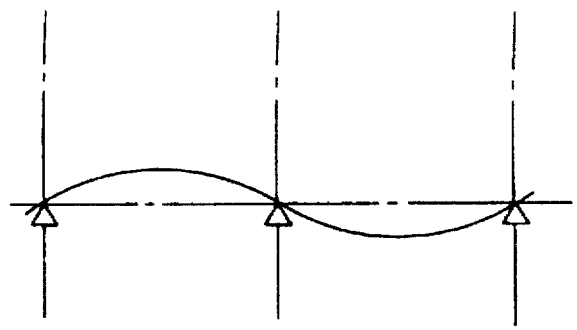

Therefore, in the canned motor pump provided with the motor 10 having the slender rotor, the rotor shaft 12 is regarded as having a three point support (FIG. 3 (b)) which behaves in mode type (FIG. 3 (c)). Thus, the diameter d of the rotor shaft 12 and the size as well as the capacity of the bearings 14 are reduced. Also, a small diameter D of the motor rotor 16 may reduce the rotational peripheral speed. The fluid friction loss decreases, which is proportional to the fifth power of the diameter D against the cooling and lubrication liquid passing through the path 18 and also the cavotation erosion decreases. As a result, the fluid friction loss, or the bearing load on the rotor 12 may be decreased, further causing a reduction in the rotor shaft diameter d as well as the capacity of the bearings 14.

Unlike the above conventional motors, introducing the slender motor 10 allows obtaining stable pump operations in an increase of the rotor speed by effectively avoiding any dangerous rotor speed without any need for modifications or changes in design of the rotor shaft, the bearings, etc.

As described above, the slender motor for the canned motor pump related to this invention is provided with the motor rotor between a pair of the bearings on the rotor shaft and also with the motor stator around the outer surface of the motor rotor through the path for cooling and lubrication liquid. The ratio of axial length to diameter of the motor rotor is so selected as to permit the cooling and lubrication liquid passing through the path to provide a bearing effect on the rotor shaft. The rotor substantially has three suporting points allowing a reduction in the bearing load of the motor rotor. Unlike the conventional motors, this invention may assure the stable pump operation even in the rotor shaft (pump) speed increase by avoiding any dangerous rotor speed or rotation without any need for modifications or changes in design of the rotor shaft and the bearings.

Whereas modifications of the present invention will no doubt be apparent to a person having ordinary skill in the art, to which the invention pertains, it is to be understood that the embodiments shown and described below by way of illustrations are by no means intended to be considered in a limiting sense. Accordingly, it is to be intended to cover by claims all modifications of the invertion which fall within the spirit and scope of the invention.

What is claimed is:

1. A motor structure of a canned motor pump, comprising:
  a stator with an inner wall cylindrically defining an inner space which has a center axis, a first length in an axial direction and a first diameter;
  a rotary shaft extending on said center axis and being accommodated within said inner space;
  a rotor accommodated within said inner space and fixed on a center part of said rotary shaft so as to show a rotation in conjunction with said rotary shaft, said rotor being cylindrically defined to have both a second length, in said axial direction, smaller than said first length and a second diameter smaller than said first diameter so as to form, between said rotor and said inner wall, a first clearance providing a first path for a cooling and lubricating liquid; and
  bearings provided on said rotary shaft at opposite sides of said rotor and spaced apart from said rotor,
  wherein a ratio of said second length to said second diameter of said rotor is not less than 5 thereby to allow said cooling and lubricating liquid flowing in said first clearance in order to provide a secondary bearing function for supporting said rotor directly.

* * * * *